US008334929B2

(12) United States Patent
Matsunaka

(10) Patent No.: US 8,334,929 B2
(45) Date of Patent: Dec. 18, 2012

(54) SIGNAL PROCESSING APPARATUS, AND METHOD FOR CONTROLLING SIGNAL PROCESSING APPARATUS

(75) Inventor: Shinji Matsunaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 12/420,866

(22) Filed: Apr. 9, 2009

(65) Prior Publication Data

US 2009/0256968 A1 Oct. 15, 2009

(30) Foreign Application Priority Data

Apr. 10, 2008 (JP) ................................ P2008-102712

(51) Int. Cl.
*H04N 9/76* (2006.01)

(52) U.S. Cl. ........ 348/598; 348/441; 348/445; 348/578; 348/584

(58) Field of Classification Search ........................ None
See application file for complete search history.

(56) References Cited

U.S. PATENT DOCUMENTS 6,268,887 B1 * 7/2001 Watanabe et al. ............. 348/554
6,526,098 B1 * 2/2003 Kato et al. ............... 375/240.24

FOREIGN PATENT DOCUMENTS

JP 2007 13466 1/2007

* cited by examiner

*Primary Examiner* — Jefferey Harold
*Assistant Examiner* — Omer Khalid
(74) *Attorney, Agent, or Firm* — Frommer Lawrence & Haug LLP; William S. Frommer; Thomas F. Presson

(57) ABSTRACT

A signal processing apparatus, comprising: an input section; a storage section; first and second signal processing sections; and a control section.

3 Claims, 6 Drawing Sheets

SIGNAL PROCESSING APPARATUS, AND METHOD FOR CONTROLLING SIGNAL PROCESSING APPARATUS

BACKGROUND OF THE INVENTION

1. Field of the Invention

The present invention relates to a signal processing apparatus for performing real-time signal processing on two types of video signals in accordance with different transmission standards supporting single and dual links, using signal processing sections composed of processing circuits with an identical structure in parallel, and a method for controlling this signal processing apparatus.

2. Description of the Related Art

A digital multi-effector for performing real-time special effects processing on known interlaced video signals performs the special effects processing on the video signals in the following manner. That is, when the digital multi-effector takes a video signal containing 30 frames (25 frames) per second, for example, the digital multi-effector converts images corresponding to one field (i.e., field images) into frame images to generate pseudo frames with an interpolation process, then subjects them to the special effects processing such as wipes in real time, and outputs the result.

There is a limit to the signal processing speed of devices forming circuitry, and an increase in the signal processing speed is difficult to achieve, or more expensive devices (more than twice more expensive devices) are needed. As such, use of dual link for a transmission system for transmitting the signal allows provision of inexpensive devices for two links to suffice, resulting in an inexpensive system (see Japanese Patent Laid-open No. 2007-13466). Circuits that perform high-speed processes cause a problem specific to high frequency circuits, and therefore designing of such circuits as a circuit board involves a difficulty in itself. Thus, designing of a circuit board that has half the processing speed is easier, resulting in a reduction in costs.

In such a digital multi-effector that performs the real-time special effects processing on the interlaced video signals transmitted over two transmission lines supporting a single link, two processing systems that perform the special effects processing on a 1-channel interlaced video signal are provided in parallel, for example.

SUMMARY OF THE INVENTION

On the other hand, in a digital multi-effector that performs the real-time special effects processing on a progressive video signal transmitted over a transmission line supporting the dual link, signal processing systems for performing the special effects processing on the known interlaced video signals are simply connected in parallel. In the digital multi-effector using these signal processing systems, however, pseudo frame images are generated from two types of signals separated from the progressive video signal, i.e., signals composed of odd scanning lines and signals composed of even scanning lines, and they are subjected to the signal processing. Accordingly, application of special effects to video must involve a reduction in visual quality, as compared to the visual quality to be expected from the progressive video signal.

Therefore, the digital multi-effector that performs the real-time special effects processing on the progressive video signal transmitted over the transmission line supporting the dual link need to be developed as dedicated hardware, which involves an increase in costs, development time, and circuit scale.

The present invention addresses the above-identified, and other problems associated with existing methods and apparatuses, and provides a signal processing apparatus that is capable of performing signal processing on both the interlaced video signals transmitted over the transmission line supporting the single link and the progressive video signal transmitted over the transmission line supporting the dual link, using signal processing systems for performing the signal processing, such as the special effects processing, on an existent interlaced video signal, and also provides a method for controlling the signal processing apparatus.

According to an embodiment of the present invention, there is provided a signal processing apparatus including: an input section configured to take a video signal in accordance with a first transmission standard supporting a single link or a video signal in accordance with a second transmission standard supporting a dual link, the first transmission standard allowing 2-channel interlaced video signals to be transmitted sequentially in parallel on a field by field basis, the second transmission standard allowing progressive video signals to be divided into field signals for odd scanning lines and field signals for even scanning lines, and allowing the two types of field signals to be transmitted sequentially in parallel. The signal processing apparatus further includes a storage section configured to store the video signal inputted to the input section; first and second signal processing sections configured to subject the video signal stored in the storage section to a filtering process in an orthogonal direction with respect to the scanning lines, using processing circuits with an identical structure in parallel; and a control section configured to control supply of the video signal from the storage section to the first and second signal processing sections. When the video signal in accordance with the first transmission standard has been inputted to the input section, the control section performs control for causing the 2-channel interlaced video signals to be superimposed on a unit image by unit image basis and stored in the storage section, dividing the video signal stored in the storage section at each boundary between adjacent unit images, and supplying each of the 2-channel interlaced video signals to a corresponding one of the first and second signal processing sections. When the video signal in accordance with the second transmission standard has been inputted to the input section, the control section performs control for causing the progressive video signals to be superimposed on a unit image by unit image basis and stored in the storage section, dividing the video signal stored in the storage section at every other boundary between adjacent unit images, and supplying the field signals for the odd scanning lines and the field signals for the even scanning lines to the first and second signal processing sections, respectively.

According to another embodiment of the present invention, there is provided a method for controlling a signal processing apparatus, the method including the steps of: a) inputting, to an input section, a video signal in accordance with a first transmission standard supporting a single link or a video signal in accordance with a second transmission standard supporting a dual link, the first transmission standard allowing 2-channel interlaced video signals to be transmitted sequentially in parallel on a field by field basis, the second transmission standard allowing progressive video signals to be divided into field signals for odd scanning lines and field signals for even scanning lines, and allowing the two types of field signals to be transmitted sequentially in parallel. The method further includes b) when the video signal in accordance with the first transmission standard has been inputted to the input section, performing control for causing the 2-channel interlaced video signals to be superimposed on a unit image by unit image basis and stored in a storage section, dividing the video signal stored in the storage section at each boundary between adjacent unit images, and supplying each of the 2-channel interlaced video signals to a corresponding one of first and second signal processing sections composed of processing circuits with an identical structure in parallel. The method still further includes c) when the video signal in accordance with the second transmission standard has been inputted to the input section, performing control for causing the progressive video signals to be superimposed on a unit image by unit image basis and stored in the storage section, dividing the video signal stored in the storage section at every other boundary between adjacent unit images, and supplying the field signals for the odd scanning lines and the field signals for the even scanning lines to the first and second signal processing sections, respectively; and d) subjecting the video signal supplied by step b) or c) to a filtering process in an orthogonal direction with respect to the scanning lines, using the first and second signal processing sections.

According to the present embodiment, it is possible to perform real-time signal processing on both the interlaced video signal transmitted over a transmission line supporting the single link and the progressive video signal transmitted over a transmission line supporting the dual link, using signal processing systems for performing the signal processing, such as special effects processing, on the existent interlaced video signal. This contributes to reducing the increase in costs, development time, and circuit scale as demanded for the signal processing apparatus for performing the signal processing, such as the special effects processing.

DETAILED DESCRIPTION OF THE PREFERRED EMBODIMENTS

Figure 1:
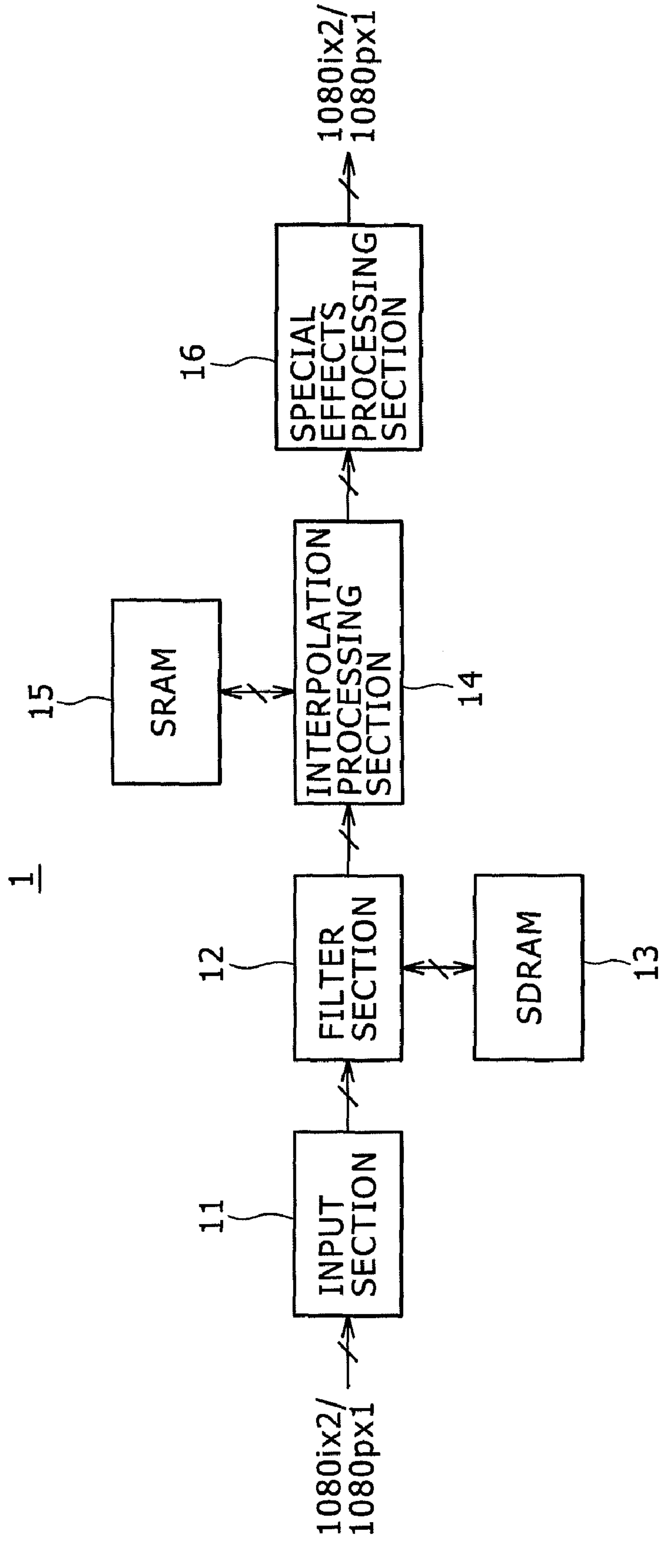
FIG. 1 is a block diagram illustrating the overall structure of a special effects processing apparatus.

A signal processing apparatus according to an embodiment of the present invention will now be described in detail below, with reference to a special effects processing apparatus 1 as illustrated in FIG. 1.

The special effects processing apparatus 1 is a device for performing real-time special effects processing, such as scaling, translation, rotation, or transformation, on a video material of a video signal, and outputting the resultant video signal, for example. The special effects processing apparatus 1 includes an input section 11 to which are inputted video signals that are transmitted over two transmission lines supporting single and dual links. The special effects processing apparatus 1 further includes, for the purpose of performing signal processing on the video signal, a filter section 12 for performing a filtering process on the video signal, an interpolation processing section 14 for performing an interpolation process on the video signal, and a special effects processing section 16 for performing the special effects processing on the video signal and outputting the resulting video signal. The special effects processing apparatus 1 further includes, as storage sections for temporarily storing the video signal, an SDRAM 13 that is connected to the filter section 12 and an SRAM 15 that is connected to the interpolation processing section 14.

A video signal in accordance with one of two types of transmission standards is inputted to the input section 11 via the two transmission lines supporting the single and dual links.

Figure 2A:
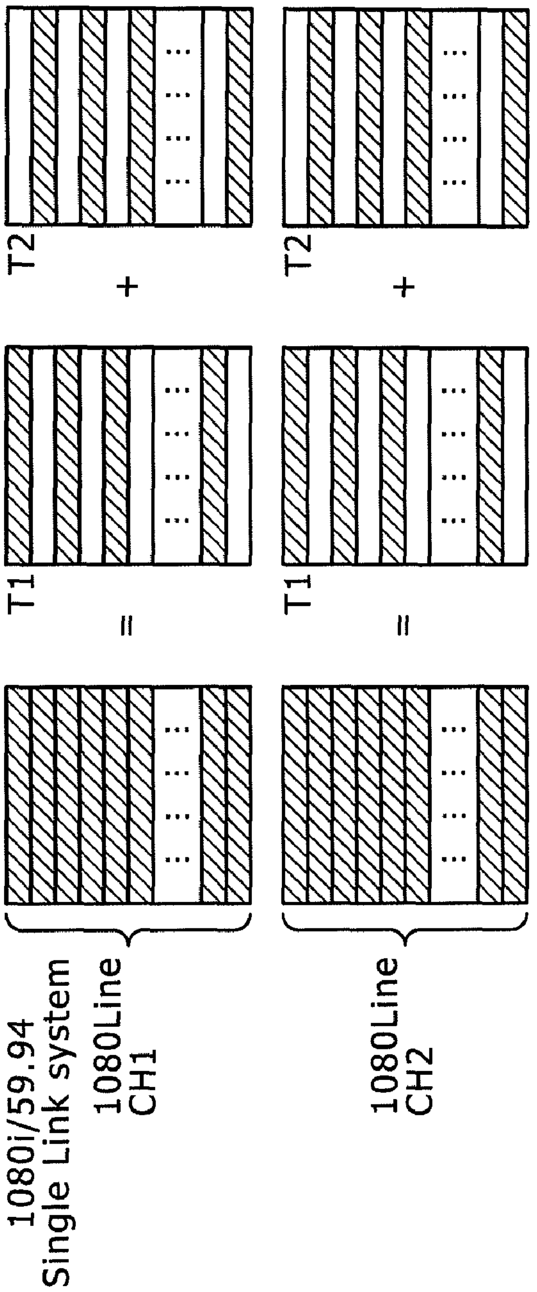
FIGS. 2A and 2B are diagrams for explaining transmission standards for video signals that are inputted from two transmission lines supporting single and dual links.

For example, as a video signal in accordance with a first transmission standard, a single link-supporting video signal is inputted to the input section 11 as illustrated in FIG. 2A. In the single link-supporting video signal, 2-channel (CH1 and CH2) interlaced video signals are transmitted sequentially in parallel on a field by field basis. FIG. 2A illustrates an exemplary case where interlaced video signals with 1080 effective scanning lines and a frame rate of 59.94 Hz (hereinafter referred to as "video format 1080i/59.94") are transmitted over the two transmission lines supporting the single link. More specifically, when the video signals in the video format 1080i/59.94 are inputted to the input section 11 over the two transmission lines supporting the single link, video signals corresponding to a first field of the channels CH1 and CH2 are inputted to CH1 and CH2, respectively, at a first point T1 in time, and video signals corresponding to a second field of the channels CH1 and CH2 are inputted to CH1 and CH2, respectively, at a second point T2 in time.

Figure 2B:
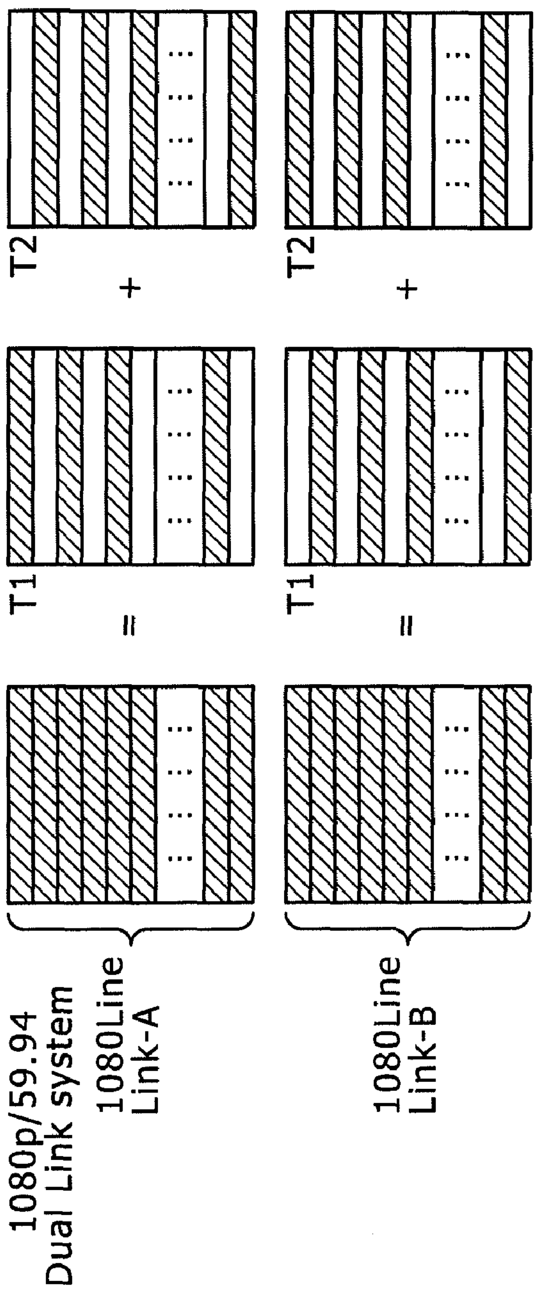

Also, as a video signal in accordance with a second transmission standard, a dual link-supporting video signal is inputted to the input section 11 as illustrated in FIG. 2B. In the dual link-supporting video signal, a progressive video signal is divided into a field signal for odd scanning lines and a field signal for even scanning lines, and the two field signals are transmitted sequentially in parallel. FIG. 2B illustrates an exemplary case where progressive video signals with 1080 effective scanning lines and a frame rate of 59.94 Hz (hereinafter referred to as "video format 1080p/59.94") are transmitted over the two transmission lines supporting the dual link. More specifically, when the video signals in the video format 1080p/59.94 are inputted to the input section 11 over the two transmission lines supporting the dual link, of a video signal forming one frame image, a signal for a field composed of odd scanning lines is inputted to Link-A, and a signal for a field composed of even scanning lines is inputted to Link-B, at a first point T1 in time. Then, at a next point T2 in time, a signal for the field composed of the even scanning lines is inputted to Link-A, and a signal for the field composed of the odd scanning lines is inputted to Link-B, in the input section 11.

Figure 3:
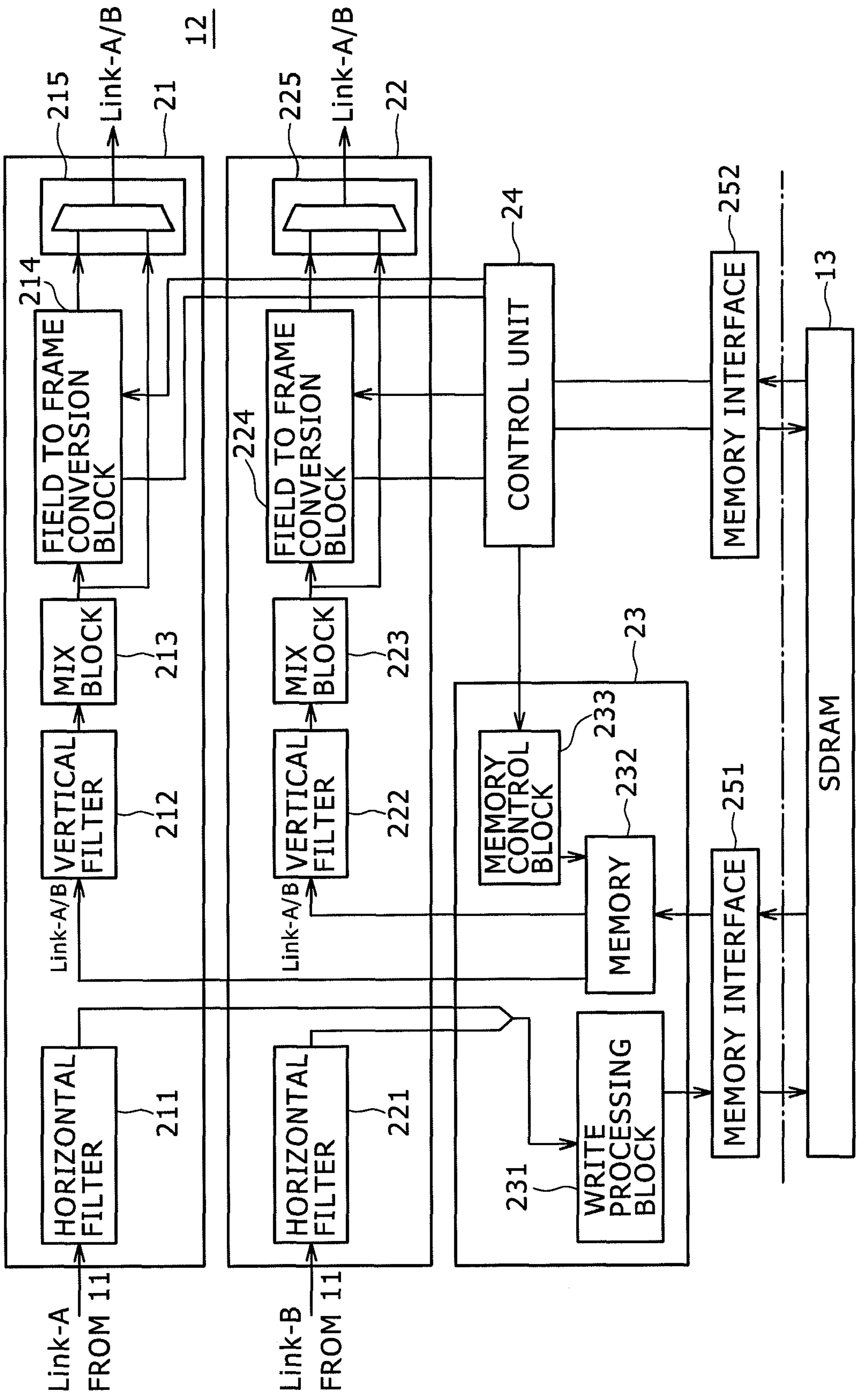
FIG. 3 is a block diagram illustrating a specific structure of a filter section.

The filter section 12, to which the video signal inputted to the input section 11 is supplied, has a structure as illustrated in FIG. 3.

The filter section 12 includes a first filter unit 21 and a second filter unit 22, which perform the filtering process using processing circuits with an identical structure in parallel. The filter section 12 further includes, as processing units for controlling the reading of the video signal from the SDRAM 13, a horizontal/vertical scan conversion unit 23, a control unit 24, and memory interfaces 251 and 252 for access to the SDRAM 13.

The first filter unit 21 includes a horizontal filter 211, a vertical filter 212, a MIX block 213 for performing a combining process on the video signal, a field to frame conversion block 214, and a selector 215.

The horizontal filter 211 subjects the video signal inputted to the input section 11 over the transmission line corresponding to Link-A to the filtering process in a horizontal direction with respect to the scanning lines. Then, the horizontal filter 211 supplies the video signal subjected to the filtering process to the horizontal/vertical scan conversion unit 23.

The vertical filter 212 scans the video signal as supplied from the horizontal/vertical scan conversion unit 23, which will be described later, in an orthogonal direction with respect to the scanning lines to subject it to the filtering process. Here, as will be described later, a video signal in which unit images are arranged in the orthogonal direction with respect to the scanning lines is supplied from the horizontal/vertical scan conversion unit 23 to the vertical filter 212. As a subsequent process, the vertical filter 212 rearranges the unit images forming the video signal subjected to the filtering process so that the unit images will be arranged in the horizontal direction with respect to the scanning lines, and supplies the result to the MIX block 213.

The MIX block 213 subjects the video signal as supplied from the vertical filter 212 to signal processing for image combining or the like. Then, in accordance with a control instruction from the control unit 24, which will be described later, the MIX block 213 supplies the video signal subjected to the signal processing to the field to frame conversion block 214 or the selector 215.

The field to frame conversion block 214 performs a process of converting a field image corresponding to the video signal as supplied from the MIX block 213 into a frame image. Specifically, the field to frame conversion block 214 subjects the field image to the interpolation process in the orthogonal direction with respect to the scanning lines to generate a pseudo frame image. At this time, the field to frame conversion block 214 accesses the SDRAM 13 via the control unit 24 and the memory interface 252 to acquire data necessary for the interpolation process. Then, the field to frame conversion block 214 supplies a video signal corresponding to the generated frame image to the selector 215.

In accordance with a control instruction from the control unit 24, which will be described later, the selector 215 selects the video signal as supplied from the MIX block 213 or the video signal as supplied from the field to frame conversion block 214, and outputs it to the interpolation processing section 14.

Similar to the first filter unit 21 having the above-described structure, the second filter unit 22 includes a horizontal filter 221, a vertical filter 222, a MIX block 223, a field to frame conversion block 224, and a selector 225. The horizontal filter 221 subjects the video signal inputted to the input section 11 over the transmission line corresponding to Link-B to the filtering process in the horizontal direction with respect to the scanning lines. Since the processing blocks in the second filter unit 22 are identical to those in the first filter unit 21 as described above except that different signals are inputted to the horizontal filters 211 and 221, descriptions thereof will be omitted.

Next, the structure of the horizontal/vertical scan conversion unit 23, to which the video signals are supplied in parallel from the horizontal filters 211 and 221, will now be described below.

The horizontal/vertical scan conversion unit 23 includes a write processing block 231, a memory 232, and a memory control block 233. The write processing block 231 performs a process for writing the video signal into the SDRAM 13. The memory 232 temporarily stores the video signal as read from the SDRAM 13. The memory control block 233 performs input/output control in connection with the memory 232.

The write processing block 231 performs a process of writing the video signals as supplied from the horizontal filters 211 and 221 into the SDRAM 13 via the memory interface 251.

In accordance with a control instruction from the memory control block 233, the memory 232 reads the video signal from the SDRAM 13, temporarily stores the read video signal, converts data arrangement therein, and outputs the resultant video signal to the vertical filter 212 or 222.

The memory control block 233 controls an overall operation of the horizontal/vertical scan conversion unit 23 based on information supplied from the control unit 24. Specifically, as information indicating the format of the video signal inputted to the input section 11, information indicating 1080i/59.94 supporting the single link or information indicating 1080p/59.94 supporting the dual link is inputted from the control unit 24 to the memory control block 233.

As will be described below, in the horizontal/vertical scan conversion unit 23, the memory control block 233 performs different processes depending on whether the video format of the video signal inputted to the input section 11 is 1080i/59.94 or 1080p/59.94.

Figure 4A:
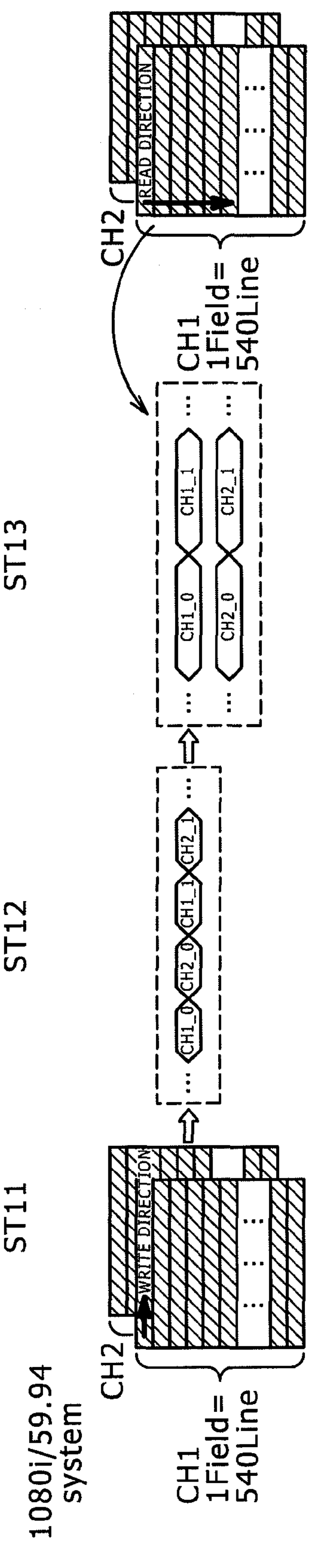
FIGS. 4A and 4B are diagrams for explaining processes in connection with a horizontal/vertical scan conversion unit.

First, processes that are performed in the horizontal/vertical scan conversion unit 23 when the video format of the video signal inputted to the input section 11 is 1080i/59.94 will now be described below with reference to FIG. 4A.

As shown at ST11, the write processing block 231 superimposes the 2-channel interlaced video signals on a unit image by unit image basis. The unit images are arranged in the scanning lines. Specifically, the write processing block 231 superimposes unit images CH1_0 and CH2_0 of CH1 and CH2 supplied from the horizontal filters 211 and 221 with twice the frequency, and stores them in the SDRAM 13.

The write processing block 231 performs the writing process as described above in connection with the SDRAM 13, so that, as shown at ST12, the SDRAM 13 stores a four-sample set of unit images where unit images CH1_0 and CH1_1, which are supplied from the channel CH1 sequentially, and unit images CH2_0 and CH2_1, which are supplied from the channel CH2 sequentially, are superimposed in such a manner as to be arranged in this order: CH1_0, CH2_0, CH1_1, and CH2_1. Superimposition of the unit images with twice the frequency as described above is performed to achieve real-time signal processing.

The memory control block 233 reads the video signal from the SDRAM 13 on a four-sample set basis as described above, and stores it in the memory 232. Then, the memory control block 233 performs control for dividing the read signal at each boundary between adjacent unit images, and supplying the unit images CH1_0 and CH1_1 and the unit images CH2_0 and CH2_1 in the interlaced video signals of the respective channels to the vertical filters 212 and 222, respectively, as shown at ST13.

By performing the above-described processes, the horizontal/vertical scan conversion unit 23 allows the interlaced video signals of the respective channels to be supplied to the vertical filters 212 and 222 on a unit image by unit image basis sequentially.

Figure 4B:
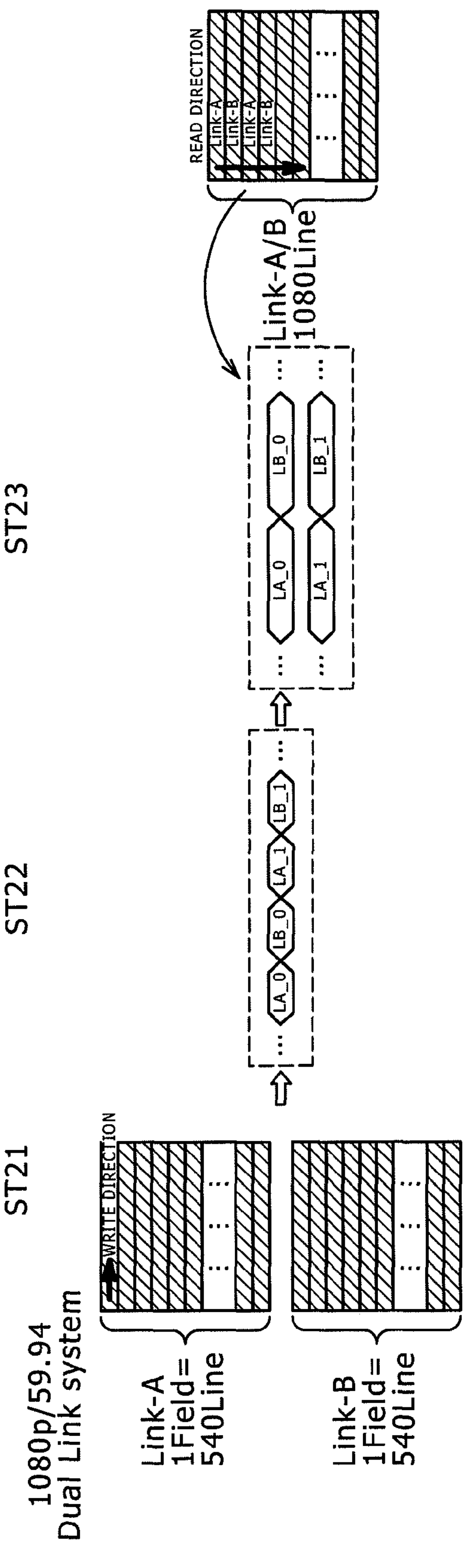

Next, processes that are performed in the horizontal/vertical scan conversion unit 23 when the video format of the video signal inputted to the input section 11 is 1080p/59.94 will now be described below with reference to FIG. 4B.

As shown at ST21, the write processing block 231 superimposes the field signal as supplied from Link-A, which forms part of the progressive video signal, and the field signal supplied from Link-B on a unit image by unit image basis. The unit images are arranged in the scanning lines. Specifically, the write processing block 231 superimposes unit images LA_0 and LB_0 of Link-A and Link-B as supplied from the horizontal filters 211 and 221 with twice the frequency, and stores them in the SDRAM 13.

The write processing block 231 performs the writing process as described above in connection with the SDRAM 13, so that, as shown at ST22, the SDRAM 13 stores a four-sample set of unit images where unit images LA_0 and LA_1, which are supplied from Link-A sequentially, and unit images LB_0 and LB_l, which are supplied from Link-B sequentially, are superimposed in such a manner as to be arranged in this order: LA_0, LB_0, LA_1, and LB_1.

The memory control block 233 reads the video signal from the SDRAM 13 on a four-sample set basis as described above, and stores it in the memory 232. Then, the memory control block 233 performs control for dividing the read signal at every other boundary between adjacent unit images, and sequentially supplying the unit images LA_0 and LB_0 and the unit images LA_1 and LB_1 to the vertical filters 212 and 222, respectively, as shown at ST23.

By performing the above-described processes, the horizontal/vertical scan conversion unit 23 allows the signal of the field composed of the odd scanning lines and the signal of the field composed of the even scanning lines to be supplied to the vertical filters 212 and 222, respectively, on a unit image by unit image basis sequentially.

As a result, the 1080p/59.94 video signal is supplied from the horizontal/vertical scan conversion unit 23 to the vertical filters 212 and 222 such that a sequence of image data forms frame images. This allows a filtering process in the orthogonal direction to be performed accurately based on image information about adjacent scanning lines.

As described above, the filter section 12 is capable of performing the signal processing on both the interlaced video signal transmitted over the transmission line supporting the single link and the progressive video signal transmitted over the transmission line supporting the dual link, using the first filter unit 21 and the second filter unit 22 for performing the signal processing, such as the special effects processing, on the existent interlaced video signal. This contributes to reducing the increase in costs, development time, and circuit scale as demanded for the signal processing apparatus for performing the signal processing, such as the special effects processing.

Next, the operation of the control unit 24 will now be described below. The control unit 24 determines whether the video signal inputted to the input section 11 is in the 1080i/59.94 format supporting the single link or in the 1080p/59.94 format supporting the dual link, and supplies information about the determination to the horizontal/vertical scan conversion unit 23. In addition, only when the video signal is an interlaced video signal, i.e., in the 1080i/59.94 format, the control unit 24 performs control for causing the two signals subjected to the signal processing by the vertical filters 212 and 222 to be supplied to the field to frame conversion blocks 214 and 224, respectively.

Further, when the video signal is in the 1080i/59.94 format, the control unit 24 controls the selectors 215 and 225 to select the video signals supplied from the field to frame conversion blocks 214 and 224, respectively, and output them to the interpolation processing section 14. In contrast, when the video signal is in the 1080p/59.94 format, the control unit 24 controls the selectors 215 and 225 to select the video signals supplied from the MIX blocks 213 and 223, respectively, and output them to the interpolation processing section 14.

As described above, the control unit 24 is capable of generating the pseudo frame images only when the video signal inputted to the input section 11 is the interlaced video signal. This allows the interpolation processing section 14 in the subsequent stage to perform the signal processing on a frame by frame basis, without the need to discriminate between the case where the format of the video signal is 1080i/59.94 and the case where the format of the video signal is 1080p/59.94.

Figure 5:
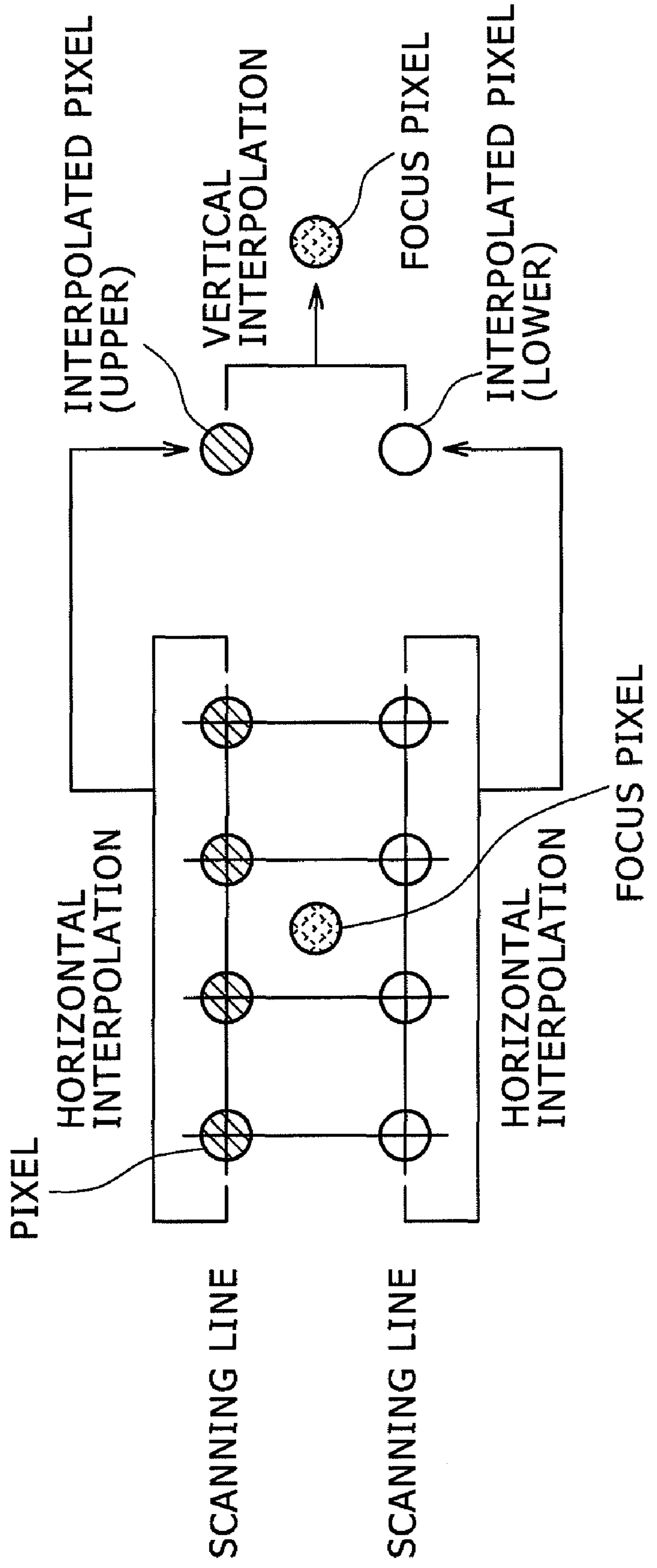
FIG. 5 is a diagram for explaining processes in connection with an interpolation processing section.

The interpolation processing section 14, to which the video signal is supplied from the filter section 12, causes the video signal from the filter section 12 to be stored in the SRAM 15 temporarily, and performs the interpolation process as illustrated in FIG. 5, for example, on the video signal.

Specifically, using pixel data of four pixels arranged on adjacent scanning lines, the interpolation processing section 14 performs the interpolation process in a horizontal direction to interpolate pixel data for pixel positions on the adjacent scanning lines above and below a focus pixel, resulting in an interpolated pixel (upper) and an interpolated pixel (lower). Next, using the interpolated pixel (upper) and the interpolated pixel (lower), the interpolation processing section 14 performs the interpolation process in a vertical direction to interpolate pixel data for the focus pixel. Then, the interpolation processing section 14 supplies the video signal subjected to the above interpolation processes to the special effects processing section 16.

Figure 6A:
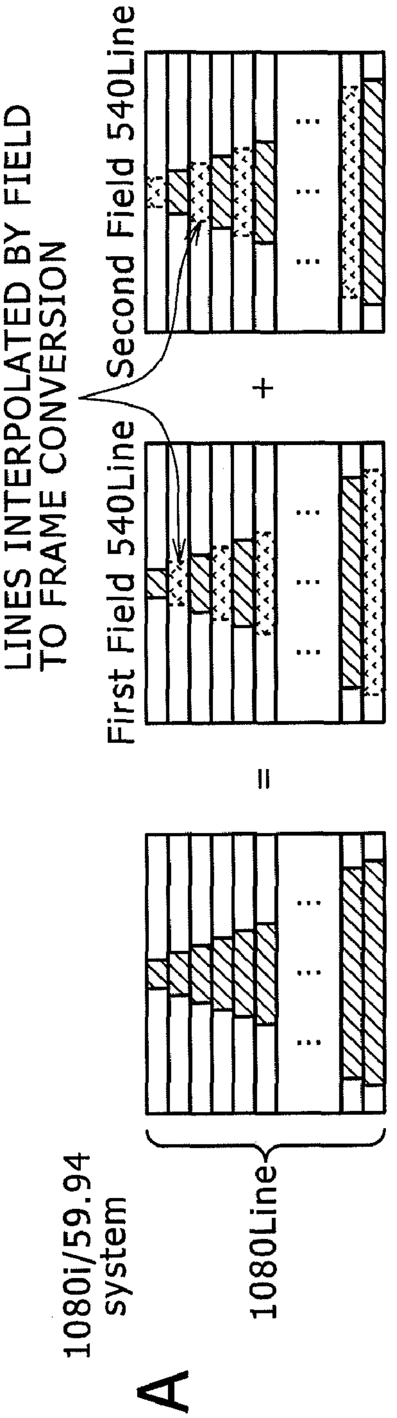
FIGS. 6A and 6B are diagrams for explaining processes in connection with a special effects processing section.
Figure 6B:
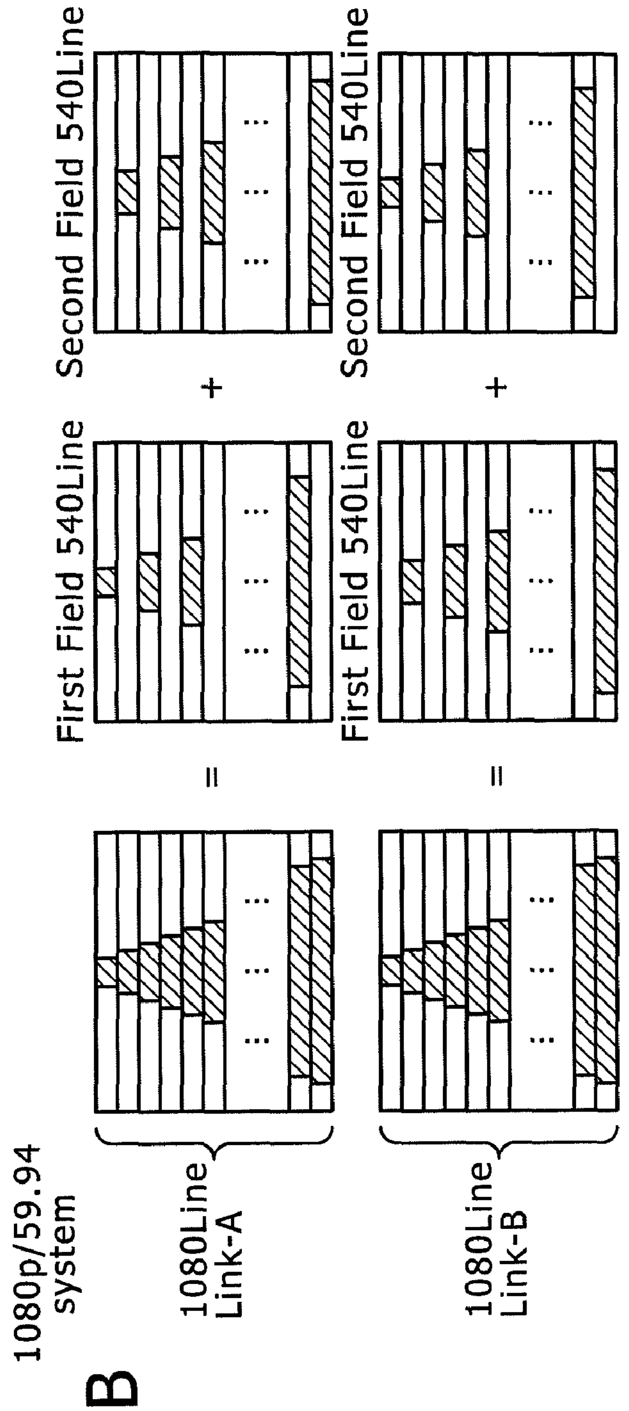

The special effects processing section 16 performs the special effects processing as illustrated in FIGS. 6A and 6B, for example, on the video signal supplied from the interpolation processing section 14, and outputs the resultant video signal to an outside of the apparatus.

In the case where the special effects processing is performed on diagonally shaded portions of the video signal in the video format 1080i/59.94 as illustrated in FIG. 6A, the special effects processing section 16 performs the special effects processing after converting each field image into a pseudo frame image.

In contrast, in the case where the special effects processing is performed on diagonally shaded portions of the video signal in the video format 1080p/59.94 as illustrated in FIG. 6B, the special effects processing section 16 performs the special effects processing using a frame image composed of a signal corresponding to Link-A and a signal corresponding to Link-B as developed in an internal memory contained in this processing section.

As described above, in the special effects processing apparatus 1, without the need for the filter section 12 to convert the progressive video signal into the pseudo frame images, the progressive video signal can be subjected to the filtering process in the horizontal/vertical direction on a frame by frame basis, and supplied to the interpolation processing section 14 and the special effects processing section 16 in the subsequent stages. This allows the special effects processing apparatus 1 to perform the real-time special effects processing on the progressive video signal and output the resultant video signal, while minimizing the reduction in visual quality.

The present application contains subject matter related to that disclosed in Japanese priority Patent Application JP 2008-102712 filed in the Japan Patent Office on Apr. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus, comprising:

an input section configured to take a video signal in accordance with a first transmission standard supporting a single link or a video signal in accordance with a second transmission standard supporting a dual link, the first transmission standard allowing 2-channel interlaced video signals to be transmitted sequentially in parallel on a field by field basis, the second transmission standard allowing progressive video signals to be divided into field signals for odd scanning lines and field signals for even scanning lines, and allowing the two types of field signals to be transmitted sequentially in parallel;

a storage section configured to store the video signal inputted to said input section;

first and second signal processing sections configured to subject the video signal stored in said storage section to a filtering process in an orthogonal direction with respect to the scanning lines, using processing circuits with an identical structure in parallel; and a control section configured to control supply of the video signal from said storage section to said first and second signal processing sections, wherein when the video signal in accordance with the first transmission standard has been inputted to said input section, said control section performs control for causing the 2-channel interlaced video signals to be superimposed on a unit image by unit image basis and stored in said storage section, dividing the video signal stored in said storage section at each boundary between adjacent unit images, and supplying each of the 2-channel interlaced video signals to a corresponding one of said first and second signal processing sections, and when the video signal in accordance with the second transmission standard has been inputted to said input section, said control section performs control for causing the progressive video signals to be superimposed on a unit image by unit image basis and stored in said storage section, dividing the video signal stored in said storage section at every other boundary between adjacent unit images, and supplying the field signals for the odd scanning lines and the field signals for the even scanning lines to said first and second signal processing sections, respectively; and two field to frame conversion sections configured to convert field images into frame images in parallel, in connection with the two signals subjected to the signal processing by said first and second signal processing sections, respectively, wherein, only when the video signal in accordance with the first transmission standard has been inputted to said input section, said control section performs control for causing the two signals subjected to the signal processing by said first and second signal processing sections, respectively, to be supplied to said field to frame conversion sections.

2. A method for controlling a signal processing apparatus, the method comprising the steps of:

a) inputting, to an input section, a video signal in accordance with a first transmission standard supporting a single link or a video signal in accordance with a second transmission standard supporting a dual link, the first transmission standard allowing 2-channel interlaced video signals to be transmitted sequentially in parallel on a field by field basis, the second transmission standard allowing progressive video signals to be divided into field signals for odd scanning lines and field signals for even scanning lines, and allowing the two types of field signals to be transmitted sequentially in parallel;

b) when the video signal in accordance with the first transmission standard has been inputted to the input section, performing control for causing the 2-channel interlaced video signals to be superimposed on a unit image by unit image basis and stored in a storage section, dividing the video signal stored in the storage section at each boundary between adjacent unit images, and supplying each of the 2-channel interlaced video signals to a corresponding one of first and second signal processing sections composed of processing circuits with an identical structure in parallel;

c) when the video signal in accordance with the second transmission standard has been inputted to the input section, performing control for causing the progressive video signals to be superimposed on a unit image by unit image basis and stored in the storage section, dividing the video signal stored in the storage section at every other boundary between adjacent unit images, and supplying the field signals for the odd scanning lines and the field signals for the even scanning lines to the first and second signal processing sections, respectively; and d) subjecting the video signal supplied by said step b) or c) to a filtering process in an orthogonal direction with respect to the scanning lines, using the first and second signal processing sections; and e) converting field images into frame images utilizing two field to frame conversion sections configured in parallel, in connection with the two signals subjected to the signal processing, respectively, wherein, only when the video signal in accordance with the first transmission standard has been inputted to said input step, said control step performs control for causing the two signals subjected to the signal processing by said first and second signal processing sections, respectively, to be supplied to said field to frame conversion sections.

3. A signal processing apparatus, comprising:

input means for taking a video signal in accordance with a first transmission standard supporting a single link or a video signal in accordance with a second transmission standard supporting a dual link, the first transmission standard allowing 2-channel interlaced video signals to be transmitted sequentially in parallel on a field by field basis, the second transmission standard allowing progressive video signals to be divided into field signals for odd scanning lines and field signals for even scanning lines, and allowing the two types of field signals to be transmitted sequentially in parallel;

storage means for storing the video signal inputted to said input means;

first and second signal processing means for subjecting the video signal stored in said storage means to a filtering process in an orthogonal direction with respect to the scanning lines, using processing circuits with an identical structure in parallel; and control means for controling supply of the video signal from said storage means to said first and second signal processing means, wherein when the video signal in accordance with the first transmission standard has been inputted to said input means, said control means performs control for causing the 2-channel interlaced video signals to be superimposed on a unit image by unit image basis and stored in said storage means, dividing the video signal stored in said storage means at each boundary between adjacent unit images, and supplying each of the 2-channel interlaced video signals to a corresponding one of said first and second signal processing means, and when the video signal in accordance with the second transmission standard has been inputted to said input means, said control means performs control for causing the progressive video signals to be superimposed on a unit image by unit image basis and stored in said storage means, dividing the video signal stored in said storage means at every other boundary between adjacent unit images, and supplying the field signals for the odd scanning lines and the field signals for the even scanning lines to said first and second signal processing means, respectively; and two field to frame conversion sections configured to convert field images into frame images in parallel, in connection with the two signals subjected to the signal processing by said first and second signal processing sections, respectively, wherein, only when the video signal in accordance with the first transmission standard has been inputted to said input means, said control means performs control for causing the two signals subjected to the signal processing by said first and second signal processing sections, respectively, to be supplied to said field to frame conversion sections.

* * * * *